Oct. 6, 1936.　　　G. D. GARDNER　　　2,056,183
FRUIT CUTTING APPARATUS
Filed March 30, 1934
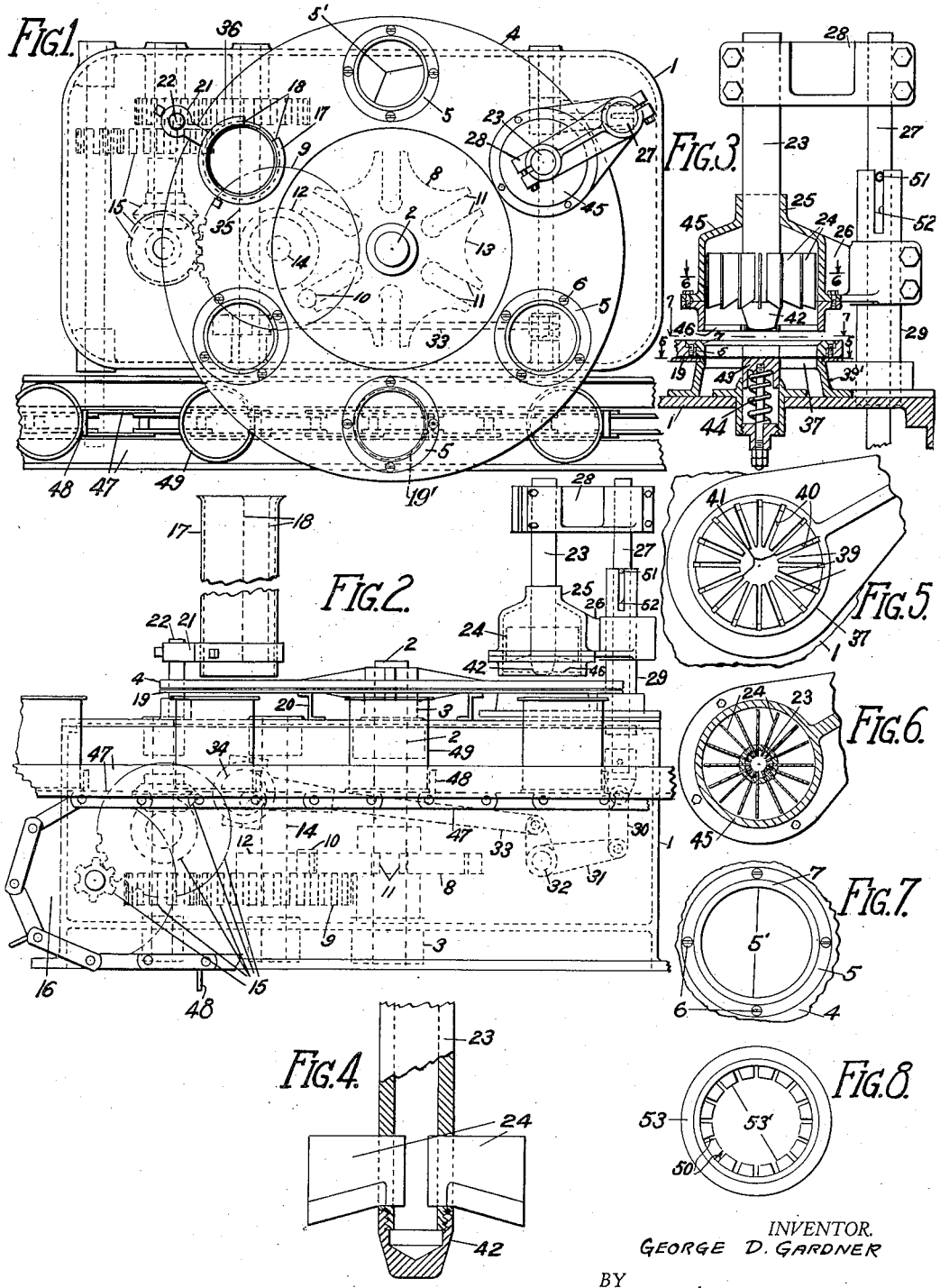
INVENTOR.
GEORGE D. GARDNER
BY
Miller Boyken & Bried,
ATTORNEYS.

Patented Oct. 6, 1936

2,056,183

UNITED STATES PATENT OFFICE 2,056,183

FRUIT CUTTING APPARATUS

George D. Gardner, San Jose, Calif.

Application March 30, 1934, Serial No. 718,164

6 Claims. (Cl. 146—6)

This invention relates to fruit cutting apparatus, and has for its objects the provision of improved means for cutting units of fruit, preferably pineapple, into predetermined numbers of pieces and for depositing said fruit into cans, and which apparatus is easily adaptable to use with various sized units of fruit and to cut the fruit into variable numbers of equally sized pieces as is desired. Other objects will appear in the specification.

In the drawing Fig. 1 is a plan view of my device.

Fig. 2 is an elevation view of Fig. 1.

Fig. 3 is an enlarged sectional view of the fruit cutting assemblage of Fig. 2.

Fig. 4 is an enlarged fragmentary view of the knife supporting rod and blades, partly in section.

Fig. 5 is a view of the cutting anvil as seen along the line 5—5 of Fig. 3.

Fig. 6 is a sectional view of Fig. 3 as seen along the line 6—6 thereof.

Fig. 7 is a plan view of the fruit carrier device as seen along the line 7—7 of Fig. 3.

Fig. 8 is a plan view of one of the members adapted to be fitted into the opening in the fruit carrier for adapting it to smaller sized fruit units.

Briefly described, the invention as disclosed in the drawing comprises apparatus particularly adapted for segmenting whole annular slices of pineapple. A circular horizontally disposed rotatable disk is provided having equally spaced circular openings around its margin of a size to receive an individual slice of pineapple in each of said openings. Such slices are deposited in the openings by gravity from a vertically disposed tubular magazine adapted to support a vertical stack of annular slices of pineapple, said magazine being disposed directly over the path of travel of the openings in the margin of the circular disk so that the lowermost slice of fruit in the stack will drop into the respective openings in the disk as the latter is revolved.

Each slice of fruit thus deposited in one of the openings in the disk is then conveyed to a cutting device having cutting knives that segment the fruit into equal sized segments, and upon continued revolution of the disk the segments are conveyed to a position over a can conveyor where they are released from the opening in the disk to drop into a can therebelow.

The above operations are continuous, since the opening in the disk that has released the fruit segments, again passes below the magazine and receives a new slice for subsequent cutting and depositing into a can.

In detail the apparatus shown in the drawing comprises a supporting frame 1 rotatably mounting a vertical shaft 2 in suitable bearings 3 secured to the frame. A horizontally disposed circular disk 4 is secured to the upper end of shaft 2 above the frame, and which disk is provided with a circular row of equally spaced circular openings around its margin. Each of the circular openings around the margin of the disk is fitted with an annular member 5 having an outwardly extending flange around its upper edge that seats in a recess formed around the upper edge of the opening of the disk as best indicated in Fig. 3, and screws 6 extend through the flange of the annular member into the disk to secure the member in place. The diameter of the central opening 5' in the annular member is slightly greater than the external diameter of an annular slice of pineapple so the latter will freely drop into said central opening, and the upper inner edge of the annular member is slightly beveled as at 7 to insure a slice of pineapple falling into the central opening in said annular member should the slice of pineapple be deposited slightly off center instead of directly into said opening.

The shaft 2 is adapted to be intermittently revolved, and consequently disk 4 will be revolved, by means of a Geneva gear 8 and Geneva stop gear 9, the latter including a pin 10 adapted to successively engage the radially extending slots 11 in the Geneva gear upon each revolution of the Geneva stop gear whereby the disk 4 is stationary during a portion of the rotation of gear 9 and is rotated only when the pin 10 is moved to engage in one of the slots 11 in gear 8. Gear 9 is provided with a central projecting hub 12 adapted to engage arcuate radially facing surfaces 13 on gear 8 between the open ends of slots 11, the hub being cut away on the side thereof adjacent pin 10 to permit rotation of the gear 9 when the pin is engaged in one of the slots 11. Thus the disk 4 is intermittently locked against rotation and is positively rotated a predetermined distance between the locked periods.

Gear 9 is secured to a shaft 14 rotatably mounted on the frame and is continuously rotated by gearing 15 connecting the shaft 14 with a can-conveyor sprocket 16 for movement upon actuation of the latter by means not shown.

Upon rotation of disk 4, the circular openings 5' will, of course, follow a circular path of travel. A vertically positioned tubular fruit magazine 17, open at its upper and lower ends, is positioned at a point over the path of travel of openings 5' with the opening in the lower end of the magazine adapted to register with the openings 5' as the disk 4 is revolved and the Geneva gearing is arranged so that during the stationary period of disk 4, one of the openings 5' is disposed directly under the lower open end of the fruit magazine.

The tubular member 17 is adapted to support a vertical stack of whole annular slices of pineapple arranged horizontally respectively and is slotted at one side at 18 so the operative can easily fill the magazine with slices of the fruit and can also observe when the magazine requires refilling.

It will be readily seen from the foregoing description that fruit from the magazine is free to drop into each of the openings 5' as the disk 4 is revolved. The fruit that drops into the openings is supported therein by a stationary circular plate 19 positioned below the disk 4 suitably secured to the frame by brackets 20 and the lower end of the fruit magazine is positioned sufficiently close to the upper surface of disk 4 to permit only one slice of fruit being supported in each of the openings 5'. The number of slices supported in each opening can be easily varied, however, according to the thickness of the disk 4 and the thickness of the slices of pineapple, the magazine being adjustable vertically in its supporting bracket 21, which bracket is also adjustably supported on a vertical rod 22 secured to the frame, the adjustment of the bracket on the rod permitting both vertical movement and also a rotary movement on the rod, the latter movement being to enable an accurate register of the magazine over the openings 5'.

At another point along the path of travel of disk 4 in the direction of travel of the fruit that is deposited in openings 5' is a cutting device for segmenting the slices of pineapple.

This cutting device comprises a vertically reciprocable hollow rod 23 having mounted in its lower end a plurality of radially extending equally spaced cutting knives 24 projecting from the shaft. These knives are each disposed in a vertical plane with its lower edge sharpened and said lower edge is slanted from the outer end of the knife upwardly to the rod 23 in which it is suitably secured at its inner end. The extreme outer ends of these knives describe a circle of a diameter to pass through the openings 5' of the annular members 5 secured in disk 4 upon descent of the rod 23.

The rod 23 is reciprocably mounted in a bearing 25 of a bracket 26 secured to the frame 1 and the means for vertically reciprocating the rod comprises a vertical rod or shaft 27 connected at its upper end to rod 23 by an arm 28. Shaft 27 slidably extends through a bearing 29 on the frame to below the upper surface of the frame where it is pivotally connected by a link 30 to the end of one arm of a bell crank 31 that is pivoted at 32 to the frame. A connecting rod 33 connects the other arm of the crank 31 with an eccentric cam 34 on a shaft 35 that is connected by a gear 36 with the gearing 15 that effects the rotation of the Geneva gear 8 and disk 4.

This mechanism for reciprocating the knife assemblage is synchronized with the movement of the disk 4 to cause the knives to descend through the openings 5' as each of said openings successively stops below the knives, the rod 23 and knives being mounted, as before explained, so that the knives will pass through the openings 5'.

In order that the knives will pass completely through the pineapple slices, the plate 19 is provided with an opening at the point below the knives, which opening is substantially of the diameter of the openings 5'.

The plate 19 is supported below the margin of the above described opening therethrough by a cutting anvil 37 best seen in Figs. 3 and 5, which anvil comprises a horizontal plate 39 provided with radially extending slots 40 therethrough corresponding in position to the radially extending knives, and which slots extend outwardly from a central core or opening of a diameter to pass the lowermost end 42 of shaft 23, which end extends downwardly below the cutting edges of the knives, the plate of the cutting anvil being provided with a downwardly extending flange 39' around the outer ends of the slots for mounting on the top of the frame 1.

Fitting within the central core 41 of the anvil is a plug or plunger 43 urged upwardly by a spring 44 to a point where the upper surface of the plug is substantially flush with the upper surface of plate 39 of the anvil, and the upper surface of plate 39 in turn is flush with the upper surface of plate 19, as best seen in Fig. 3.

From the foregoing description, it will be seen that a slice of pineapple in an opening 5' below the knives will be supported as the knives cut through the slice, and the plunger 43 will be forced downwardly by the end 42 of rod 23 as the knives pass through the slots in plate 39, and when the rod 23 and knives are raised the plunger 43 will close the opening 41 to prevent any of the cut segments of fruit from passing through the opening 41.

In order to prevent the cut segments from sticking to the knives, I provide bearing 25 with a downwardly opening bell-shaped housing 45 of an inner diameter and size to receive the knives when they are lifted after a cutting operation. On the lower end of this bell-shaped housing I secure a stripper plate 46 substantially the same in construction as the anvil plate 31, to strip any fruit from the knives that might adhere thereto.

Spaced from the cutting device above described, and below the margin of the disk 4 and plate 19 is an ordinary fruit can-conveyor 47, comprising a sprocket chain with lugs 48 therein for moving cans 49 along a path of travel. This conveyor 47 operates the movement of the gearing 15 heretofore described and is positioned to convey the cans to a point directly below the path of travel of the openings 5'.

At the point where the path of travel of openings 5' and the cans 49 coincide, the plate 19 is provided with a circular opening 19', so that the cut segments of the fruit are free to fall through said opening in the plate 19 and into a can positioned thereunder. The conveyor actuating mechanism and the Geneva gears, together with gears 15 and sprocket 16, are so arranged that the cans are successively positioned beneath the opening in plate 19 at exactly the moment the disk 4 is rotated to convey the segments of pineapple to the opening in said plate for dropping the segments therethrough, although the movement of the cans along their path of travel is continuous.

In Figs. 3 and 4, it will be seen that the lower end of shaft 23 is slightly tapered. This is for the purpose of aligning the slices of pineapple directly below the cutting blades, since it often happens that the slices are slightly off center in the openings 5'. The reduced end of shaft 23 will freely enter the central core of the slice of pineapple, and as the rod descends the slice of fruit will be centrally aligned with the rod.

Attention is also called to the fact that the shaft 27 that actuates the knife assemblage comprising knives 24 and rod 23 is prevented from turning by a pin 51 slidable in a slot 52 in the shaft bearing.

In order to adapt my device to different sized slices of pineapple, the annular members 5 may be substituted by a ring as shown in Fig. 8 in which the diameter of the opening 53' is reduced. Ring 53 is slotted around its interior sides as at 50 to permit the knives to freely pass through the fruit, there being no necessity for changing the length of the blades.

In some instances it is desirable to change the knives, or to reduce the number so as to vary the number of segments, or to sharpen the knives, and in such cases the lower end 42 of the rod 23 is in the form of a nut, as indicated in Fig. 4, that bears against the lower edges of the knives when tightened, and which secures the knives in place. The knives themselves extend at their inner ends through slots in hollow rod 23, as best indicated in Fig. 6.

From the description above given, it is thought that the operation of my apparatus is clear and what I claim as my invention is:

1. In a machine of the character described, a plate provided with a circular recess therein, an annular member secured in said recess, the central opening in said member being of a size adapted to slidably receive an annular slice of pineapple therein, a plurality of knives disposed in alignment over said recess, means mounting said knives in radially extending positions around a central axis in co-axial relation to the central axis of the annular member, the outer ends of said knives describing a circle of greater diameter than the opening in said annular member, means for reciprocating the knives into and out of the opening of said annular member for cutting the fruit in said opening, the inner sides of the annular member being radially slotted to pass the knives upon reciprocation of the latter.

2. In a construction as defined in claim 1, a flat plate below said circular recess for supporting said slice of pineapple within the recess, said flat plate being provided with radially extending slots therein in register with the slots in said annular member for permitting said knives to pass completely through the plane in which the slice of pineapple is disposed.

3. In a machine of the character described, a supporting plate for fruit to be cut provided with a substantially horizontal flat upper surface adapted to support a flat slice of fruit thereon, said supporting plate being provided with a vertical opening therein spaced inwardly from its outer edges and a closure member disposed across said opening with its upper surface normally substantially flush with the upper surface of said plate, a cutting device spaced above said plate and over said opening provided with a plurality of horizontally extending, radially arranged cutting knives with their cutting edges lowermost, means for positioning a centrally apertured flat slice of fruit in horizontal position on said supporting plate with its central aperture generally in register with the opening in said plate, means mounting the cutting device with its knives for movement toward and away from said plate to cut said slice of fruit, means projecting downwardly below the cutting edges of said knives connected to the cutting device for movement therewith arranged and adapted to pass through the aperture in said slice of fruit and through the plate opening to align the slice below said knives upon downward movement of the cutting device, means yieldably mounting said closure member for downward displacement thereof upon engagement by the downwardly projecting fruit aligning device as the latter descends and for automatically returning to normal position when the fruit aligning device is withdrawn from the opening.

4. In a machine of the character described, a supporting member provided with a substantially flat upper surface disposed generally in a single plane arranged and adapted to slidably support a flat annular slice of fruit thereon, said supporting member including a central imperforate portion and the member formed with slots extending radially outwardly of the central portion, means for positioning a flat annular slice of fruit on said supporting member with the annular body of the fruit over said slots and with the central imperforate portion generally in co-axial alignment with the central opening in the annular slice of fruit, a cutting device spaced above said supporting member provided with a plurality of radially extending cutting knives respectively aligned over the slots in said supporting member, means for moving said knives into and out of said slots for segmenting an annular slice of fruit supported on said supporting member, means associated with said cutting knives for movement therewith, said means being positioned over the central imperforate portion of said supporting member and formed and adapted to slide the fruit into exact co-axial alignment with the axis around which the slots of the supporting member are disposed upon movement of the cutting knives toward said slots.

5. In a construction as defined in claim 4, the means associated with the knives for movement therewith to align the fruit projecting below the knives and adapted to engage said central imperforate portion upon movement of the knives to cut the fruit, and resilient means yieldably mounting said central imperforate portion for permitting limited movement of the imperforate portion thereby permitting the means for aligning the fruit to pass transversely across the plane of the surface of the supporting member upon movement of the knives to cut the fruit.

6. In a machine for cutting an annular slice of fruit into segments, a cutting device comprising a shaft provided with a tapered end portion adapted to pass into the central opening of the annular slice of fruit for axially aligning the slice with the axis of the shaft upon moving the shaft toward the fruit, a plurality of cutting knives rigid on said shaft adjacent said tapered end and extending radially outwardly therearound with the cutting edges of the knives spaced from and facing toward said tapered end portion, said cutting edges extending angularly relative to the axis of the shaft outwardly from the shaft in the direction of the tapered end but terminating at their outer ends in a plane extending across the shaft at a point spaced from the outer extremity of said end portion whereby upon movement of the shaft toward the annular slice of fruit said knives will progressively cut the annular slice from the outer edge of the slice toward the shaft after the tapered end portion is within the central opening of the annular slice and has effected an initial alignment of the slice below the knives thereby tending to force the annular portion of the fruit radially inwardly toward the shaft, and means for moving the shaft toward said annular slice of fruit.

GEORGE D. GARDNER.